United States Patent
Csurka et al.

(10) Patent No.: US 10,296,846 B2
(45) Date of Patent: May 21, 2019

(54) ADAPTED DOMAIN SPECIFIC CLASS MEANS CLASSIFIER

(71) Applicant: Xerox Corporation, Norwalk, CT (US)

(72) Inventors: Gabriela Csurka, Crolles (FR); Boris Chidlovskii, Meylan (FR); Stéphane Clinchant, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 682 days.

(21) Appl. No.: 14/950,544

(22) Filed: Nov. 24, 2015

(65) Prior Publication Data

US 2017/0147944 A1 May 25, 2017

(51) Int. Cl.
| | | |
|---|---|---|
| *G06N 3/04* | (2006.01) | |
| *G06N 3/08* | (2006.01) | |
| *G06N 5/02* | (2006.01) | |
| *G06N 20/00* | (2019.01) | |

(52) U.S. Cl.
CPC ............ *G06N 20/00* (2019.01); *G06N 3/0454* (2013.01); *G06N 5/02* (2013.01); *G06N 3/084* (2013.01)

(58) Field of Classification Search
USPC .......................................................... 706/12
See application file for complete search history.

(56) References Cited

U.S. PATENT DOCUMENTS

| | | | | |
|---|---|---|---|---|
| 7,165,216 B2* | 1/2007 | Chidlovskii | ............ | G06F 16/84 715/237 |
| 7,440,967 B2* | 10/2008 | Chidlovskii | ........ | G06F 17/2247 |
| 7,543,758 B2* | 6/2009 | Dymetman | ............ | G06K 17/00 235/375 |
| 7,730,396 B2* | 6/2010 | Chidlovskii | ............ | G06F 16/84 715/239 |
| 7,882,119 B2* | 2/2011 | Bergholz | .............. | G06F 16/258 707/758 |
| 8,175,376 B2* | 5/2012 | Marchesotti | ...... | G06F 17/30256 382/159 |

(Continued)

OTHER PUBLICATIONS

IEEE Deep Learning Face Representation from Predicting 10,000 Classes, Yi Sun, Xiaogang Wang, Xiaoou Tang pp. 1-8 CVPR2014.*

(Continued)

*Primary Examiner* — Michael B Holmes
(74) *Attorney, Agent, or Firm* — Fay Sharpe LLP

(57) ABSTRACT

A domain-adapted classification system and method are disclosed. The method includes mapping an input set of representations to generate an output set of representations, using a learned transformation. The input set of representations includes a set of target samples from a target domain. The input set also includes, for each of a plurality of source domains, a class representation for each of a plurality of classes. The class representations are representative of a respective set of source samples from the respective source domain labeled with a respective class. The output set of representations includes an adapted representation of each of the target samples and an adapted class representation for each of the classes for each of the source domains. A class label is predicted for at least one of the target samples based on the output set of representations and information based on the predicted class label is output.

22 Claims, 4 Drawing Sheets

(56) References Cited

U.S. PATENT DOCUMENTS

| | | | | |
|---|---|---|---|---|
| 8,386,574 B2* | 2/2013 | Chidlovskii | ......... | G06K 9/6284 709/206 |
| 8,538,896 B2* | 9/2013 | Mensink | ................. | G06F 17/18 706/12 |
| 8,543,563 B1* | 9/2013 | Nikoulina | ........... | G06F 17/2809 704/2 |
| 8,612,373 B2* | 12/2013 | Chidlovskii | ......... | G06N 99/005 706/20 |
| 8,655,803 B2* | 2/2014 | Lecerf | .................. | G06K 9/2072 706/12 |
| 8,726,144 B2* | 5/2014 | Chidlovskii | ........ | G06F 17/2247 715/231 |
| 8,824,797 B2* | 9/2014 | Salamati | ............... | G06T 7/0087 382/159 |
| 9,026,425 B2* | 5/2015 | Nikoulina | ........... | G06F 17/2818 704/1 |
| 9,038,172 B2* | 5/2015 | Miller | ................... | G06F 21/554 726/22 |
| 9,349,150 B2* | 5/2016 | Chidlovskii | ........... | G06Q 50/26 |
| 9,477,913 B2* | 10/2016 | Csurka | ............... | G06K 15/4095 |
| 9,710,729 B2* | 7/2017 | Chidlovskii | ....... | G06K 9/00785 |
| 9,916,542 B2* | 3/2018 | Chidlovskii | ....... | G06K 9/00684 |
| 2014/0029839 A1 | 1/2014 | Mensink et al. | | |

OTHER PUBLICATIONS

Analysis of Representations for Domain Adaptation, Shai Ben-David, John Blitzer, Koby Crammer, and Fernando Pereira pp. 1-8 2007.*
Learning and Transferring Mid-Level Image Representations using Convolutional Neural Networks, Maxime Oquab, Leon Bottou, Ivan Laptev, Josef Sivic; The IEEE Conference on Computer Vision and Pattern Recognition (CVPR), 2014, pp. 1717-1724.*
IEEE Domain adaptation for object recognition: an unsupervised approach, Raghuraman Gopalan; Ruonan Li; Rama Chellappa Published in: 2011 International Conference on Computer Vision Nov. 6-13, 2011 pp. 999-1006.*
U.S. Appl. No. 14/504,837, filed Oct. 2, 2014, Csurka, et al.
U.S. Appl. No. 14/633,550, filed Feb. 27, 2015, Bhatt, et al.
U.S. Appl. No. 14/691,021, filed Apr. 20, 2015, Perronnin, et al.
U.S. Appl. No. 14/793,374, filed Jul. 7, 2015, Soldevila, et al.
U.S. Appl. No. 14/793,434, filed Jul. 7, 2015, Soldevila, et al.
U.S. Appl. No. 14/861,386, filed Sep. 22, 2015, Rodríguez-Serrano, et al.
Baktashmotlagh, et al., Unsupervised domain adaptation by domain invariant projection, ICCV, pp. 769-776 (2013).
Bay, et al, "SURF: Speeded up robust features," ECCV, pp. 404-417 (2006).
Beijbom, "Domain adaptations for computer vision applications," CoRR, abs/1211.4860, pp. 1-9 (2012).
Blitzer, et al., "Domain adaptation with coupled subspaces," Int'l Conf. on Artificial Intelligence and Statistics, pp. 173-181 (2011).
Chen, et al. "Marginalized denoising autoencoders for domain adaptation." *arXiv preprint* arXiv:1206.4683, pp. 1-8 (2012).
Chen, et al., "Co-training for Domain Adaptation," 25th Conf. on Neural Information Processing Systems (NIPS), pp. 2456-2464 (2011).
Chidlovskii, et al., "Evaluating stacked marginalised denoising autoencoders within domain adaptation methods," CLEF 2015, vol. 9283 of Lecture Notes in Computer Science, pp. 15-27 (2015).

Csurka, et al., "Domain adaptation with a domain specific class means classifier," Computer Vision—ECCV 2014 Workshops (TASK-CV), pp. 32-46 (2014).
Csurka, et al., "Visual categorization with bags of keypoints," Workshop on statistical learning in computer vision, ECCV Workshop, vol. 1, No. 1, pp. 1-22 (2004).
Donahue, et al., "DeCAF: A deep convolutional activation feature for generic visual recognition," ICML, pp. 647-655 (2014).
Duan, et al., "Domain adaptation from multiple sources via auxiliary classifiers," Proc. 26th Annual Int'l Conf. on Machine Learning (ICML), pp. 289-296 (2009).
Farajidavar, et al., "Adaptive transductive transfer machines," Proc. British Machine Vision Conference (BMVC14), pp. 1-12 (2014).
Fernando, Basura, et al., Unsupervised visual domain adaptation using subspace alignment, ICCV, pp. 2960-2967 (2013).
Fernando, et al., "Subspace alignment for domain adaptation," CoRR, arXiv:1409.5241, pp. 1-22 (2014).
Ganin, et al., "Unsupervised domain adaptation by backpropagation,". CoRR, arXiv:1409.7495, pp. 1-11 (2014).
Glorot, et al., "Domain adaptation for large-scale sentiment classification: A deep learning approach," ICML, pp. 513-520 (2011).
Gong, et al., Reshaping visual datasets for domain adaptation. Advances in Neural Information Processing Systems, pp. 1286-1294 (2013).
Gopalan, et al., "Domain adaptation for object recognition: An unsupervised approach," ICCV, pp. 999-1006 (2011).
Harley, et al., "Evaluation of deep convolutional nets for document image classification and retrieval," ICDAR, *arXiv preprint* arXiv:1502. 07058, pp. 991-995 (2015).
Jiang, et al., "A Literature Survey on Domain Adaptation of Statistical Classifiers," Technical report, pp. 1-12 (2008).
Krizhevsky, et al., "Imagenet classification with deep convolutional neural networks," NIPS, pp. 1097-1105 (2012).
Lin, et al., "Support vector machines for classification in non-standard situations," Machine Learning, vol. 46, Issue 1-3, pp. 191-202 (2002).
Lowe, "Object recognition from local scale-invariant features," ICCV, vol. 2, pp. 1150-1157 (1999).
Maaten, et al., "Learning with marginalized corrupted features," ICML, pp. 410-418 (2013).
Mensink, et al., Distance-based image classification: Generalizing to new classes at near zero cost. PAMI, 35 (11), pp. 2624-2637 (2013).
Pan, et al., "A survey on transfer learning," IEEE Transactions on Knowledge and Data Engineering, 22(10), pp. 1345-1359 (2010).
Perronnin, et al., "Fisher vectors meet neural networks: A hybrid classification architecture," Proc. IEEE Conf. on Computer Vision and Pattern Recognition (CVPR), pp. 3743-3752 (2015).
Russakovsky, et al., "Imagenet large scale visual recognition challenge," Int'l J. Computer Vision, 1-42, arXiv 1409.0575, pp. 211-252 (2014).
Saenko, K., et al., "Adapting visual category models to new domains," ECCV, vol. 6314 of Lecture Notes in Computer Science, pp. 213-226 (2010).
Vincent, et al., "Extracting and composing robust features with denoising autoencoders," Proc. 25th Int'l Conf. on Machine learning (ICML), pp. 1096-1103 (2008).
Xu, et al., "From sBoW to dCoT marginalized encoders for text representation," Proc. 21st ACM Int'l Conf. on Information and knowledge management (CIKM), pp. 1879-1884 (2012).

* cited by examiner

ADAPTED DOMAIN SPECIFIC CLASS MEANS CLASSIFIER

BACKGROUND

The exemplary embodiment relates to the field of domain adaptation (DA) and finds particular application in adapting a classifier, derived from one or multiple source domains, to a target domain.

Domain adaptation addresses the problem of leveraging labeled data in one or more related domains, often referred to as "source" domains, when learning a classifier for labeling unseen data in a "target" domain. The domains are assumed to be related but not identical. When models learned on the source domain are applied directly in the target domain, the performance is often poor due to the domain shift. For example, document types such as invoices, emails, reports, and forms can vary in appearance from one company to another. In general, however, these sources can still bring useful information for building classifiers in the target domain, particularly when labels are not available in the target domain. For example, book or film reviews, while being quite different from review of a printing device or a web service, may contain common features which enable assessment of whether or not the customers are satisfied with the item being reviewed.

Domain adaptation methods are described, for example, in L. Duan, et al., "Domain adaptation from multiple sources via auxiliary classifiers," ICML 2009; K. Saenko, et al., "Adapting visual category models to new domains," ECCV 2010; X. Glorot, et al., "Domain adaptation for large-scale sentiment classification: A deep learning approach," ICML 2011; R. Gopalan, et al., "Domain adaptation for object recognition: An unsupervised approach," ICCV 2011; O. Beijbom, "Domain adaptations for computer vision applications," CoRR, arXiv:1211.4860, 2012; B. Gong, et al., "Reshaping visual datasets for domain adaptation," NIPS 2013; M. Baktashmotlagh, et al., "Unsupervised domain adaptation by domain invariant projection, ICCV 2013; B. Fernando, et al., "Unsupervised visual domain adaptation using subspace alignment, ICCV 2013; Y. Ganin, et al., "Unsupervised domain adaptation by backpropagation," CoRR, arXiv:1409.7495, 2014, hereinafter "Ganin 2014"; and N. Farajidavar, et al., "Adaptive transductive transfer machines," BMVC 2014, hereinafter, "Farajidavar 2014."

In general, domain adaptation methods seek to compensate for the mismatch between source and target domains by making use of information coming from both source and target domains during the learning process. The classifiers are learned or adapted automatically to the target domain either by exploiting labeled target examples (known as semi-supervised DA) or by assuming that the target domain data is fully unlabeled (unsupervised DA). Existing DA methods also generally assume that labeled source data is widely available. However, such an assumption rarely holds in practice, e.g., for confidentiality reasons.

There remains a need for a system and method for generating a classifier for a target domain when labeled target data is not available and there is a shortage of source data.

INCORPORATION BY REFERENCE

The following references, the disclosures of which are incorporated herein by reference in their entireties, are mentioned:

U.S. Pub. No. 20140029839, published Jan. 30, 2014, entitled METRIC LEARNING FOR NEAREST CLASS MEAN CLASSIFIERS, by Thomas Mensink, et al.

U.S. application Ser. No. 14/504,837, filed Oct. 2, 2014, entitled SYSTEM FOR DOMAIN ADAPTATION WITH A DOMAIN SPECIFIC CLASS MEANS CLASSIFIER, by Gabriela Csurka, et al.

U.S. application Ser. No. 14/633,550, filed Feb. 27, 2015, entitled CONTENT-AWARE DOMAIN ADAPTATION FOR CROSS-DOMAIN CLASSIFICATION, by Himanshu Sharad Bhatt, et al.

U.S. application Ser. No. 14/691,021, filed Apr. 20, 2015, entitled FISHER VECTORS MEET NEURAL NETWORKS: A HYBRID VISUAL CLASSIFICATION ARCHITECTURE, by Florent C. Perronnin, et al.

U.S. application Ser. No. 14/793,374, filed Jul. 7, 2015, entitled LATENT EMBEDDINGS FOR WORD IMAGES AND THEIR SEMANTICS, by Albert Gordo Soldevila, et al.

U.S. application Ser. No. 14/793,434, filed Jul. 7, 2015, entitled EXTRACTING GRADIENT FEATURES FROM NEURAL NETWORKS, by Albert Gordo Soldevila, et al.

U.S. application Ser. No. 14/861,386, filed Sep. 22, 2015, entitled SIMILARITY-BASED DETECTION OF PROMINENT OBJECTS USING DEEP CNN POOLING LAYERS AS FEATURES, by José Rodríguez-Serrano, et al.

BRIEF DESCRIPTION

In accordance with one aspect of the exemplary embodiment, a domain-adapted classification method includes mapping an input set of representations to generate an output set of representations using a learned transformation. The input set of representations includes a set of target samples from a target domain and, for each of a plurality of source domains, a class representation for each of a plurality of classes. The class representations are each representative of a set of source samples from the respective source domain that are labeled with a respective class. The output set of representations includes an adapted representation of each of the target samples and an adapted class representation for each of the classes for each of the source domains. A class label is predicted for at least one of the target samples, based on the output set of representations and information based on the predicted class label is output.

At least one of the mapping of the input set of representations and the predicting of the class label may be performed with a processor.

In accordance with another aspect, a classification system includes a mapping component which maps an input set of representations to generate an output set of representations. The input set of representations includes a set of target samples from a target domain and, for each of a plurality of source domains, a class representation for each of a plurality of classes. The class representations are each representative of a set of source samples labeled with a respective class. The output set of representations includes an adapted representation of each of the target samples and an adapted class representation for each of the classes for each of the source domains. A classifier component, for each of the classes, generates a classifier based on the adapted class representations for that class for each of the source domains and predicts a label for at least one of the target samples using the classifiers. An output component outputs information based on the predicted class label. A processor implements the mapping component, classifier component, and output component.

In accordance with another aspect of the exemplary embodiment, a classification method includes mapping an input set of representations to generate an output set of representations using a learned transformation. The input set of representations includes a set of target samples from a target domain and, for each of a plurality of source domains, a class representation for each of a plurality of classes. The class representations are each representative of a respective set of source samples from a respective one of the source domains that are labeled with a respective class. The output set of representations includes an adapted representation of each of the target samples and an adapted class representation for each of the classes for each of the source domains. For each class, a classifier is generated with the adapted class representations for that class for each of the source domains. A class label for at least one of the target samples is predicted with the classifiers. Information based on the predicted class label is output.

At least one of the mapping of the input set of representations and the predicting of the class label may be performed with a processor.

DETAILED DESCRIPTION

Figure 1:
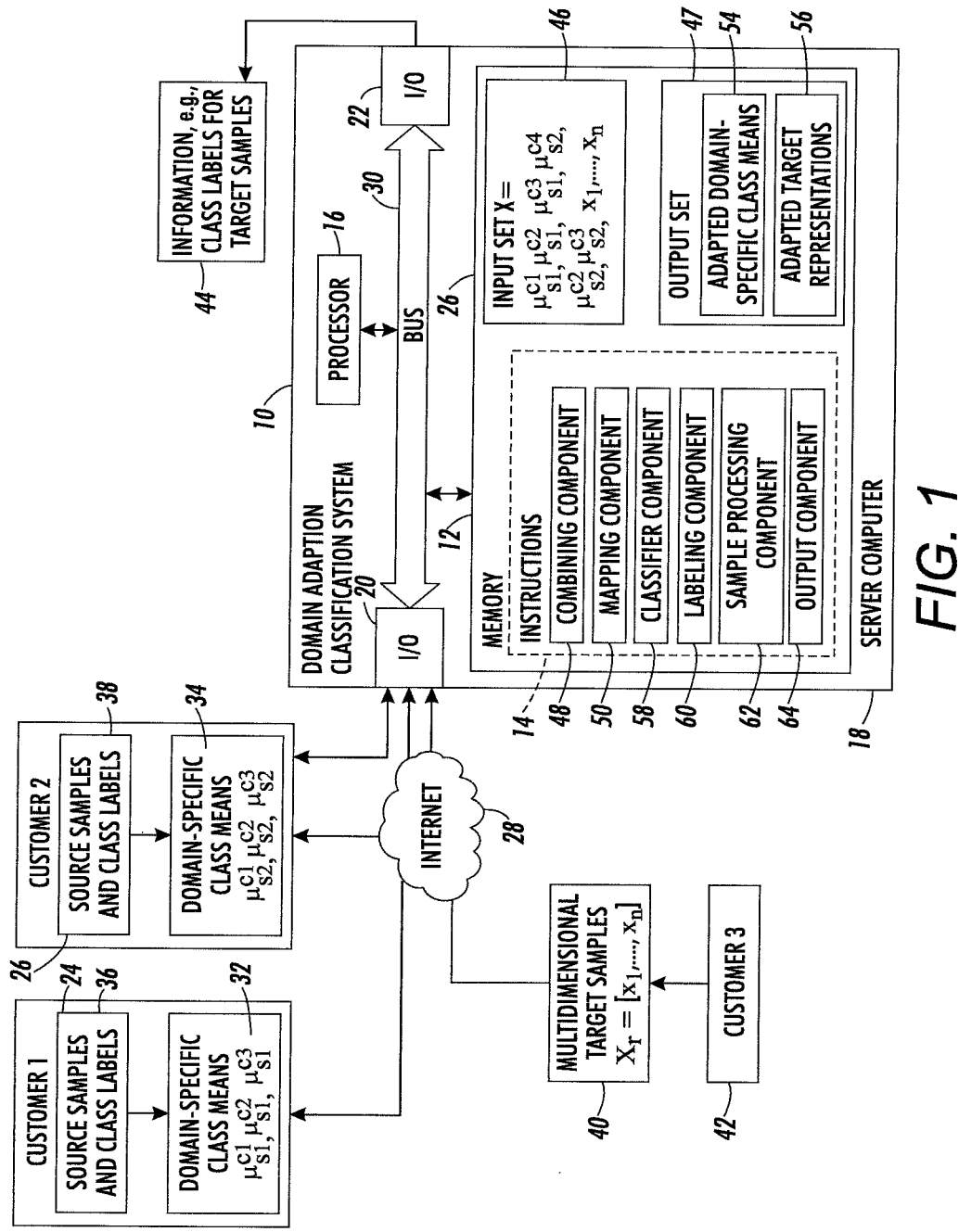
FIG. 1 is a functional block diagram of a domain adaptation system for classification of target samples, such as images or text documents, in accordance with one aspect of the exemplary embodiment.

Aspects of the exemplary embodiment relate to a computer-implemented system and method for learning a classifier model suited to predicting class labels for target samples from a target domain. The classifier model is learned using class representations (each representing a set of source samples in a respective class) from one or more source domains and target samples (feature-based representations of objects) from the target domain. Aspects also relate to a system and method for classifying samples in the target domain with the learned classifier model. The system and method are particularly applicable to the case where source data is provided only in an aggregated form.

In one exemplary embodiment, the target samples to be classified and the source samples used to generate the class representations are multidimensional features-based representations of images, such as photographic images or scanned images of documents. The features on which the multidimensional image representations are based can be extracted from patches of the images or extracted using a deep neural network. In another exemplary embodiment, the source and target samples are multidimensional features-based representations of text documents. However, the objects being represented are not limited to images and text documents, and the samples are not limited to any specific type of representation. The method finds application in a variety of data processing fields where the data is received in the form of multi-dimensional representations in a common feature space.

In contrast to the existing approaches, the method can be employed when there is no access to the actual source data. Rather, access to an aggregation of the data for each of a plurality of classes is available, in the form of class representations, such as class means. The exemplary system and method combine the class means with an approach based on unsupervised Stacked Marginalized Denoising Autoencoders (sMDA) to solve both unsupervised (US) and semi-supervised (SS) domain adaptation tasks. Such autoencoders are referred to as marginalized Stacked Denoising Autoencoders in M. Chen, et al., "Marginalized denoising autoencoders for domain adaptation," Proc. 29th Int'l Conf. on Machine Learning (ICML), arXiv:1206.4683, 2012, hereinafter, "Chen 2012". This adaptation of class means with sMDA is referred to herein as Adapted Class Means (ACM).

The exemplary method exploits the correlation between the target data and source class representations without the need to have target labels and automatically adapts the class representations of the source data to the target dataset.

There are several benefits of the exemplary system and method. For example, class representations, such as class means, for different sources can be precomputed and stored so that when predicting class labels for a target domain, the precomputed class means can be retrieved. This allows each source to be handled independently or consecutively in the case of the method being used iteratively for each customer. Additionally, new classes for previous customers or new customers (sources) can be added at any time to enrich the available training set, which can improve the predictions. The source data itself can be retained by the customers, with merely the class means being made available to the system.

The exemplary system and method can use multiple sources by exploiting several class means from different sources simultaneously. In some embodiments, the selection of sources can be optimized to yield higher accuracy. In other embodiments, the method may be performed with all available sources, which avoids the need to identify the best source combination (especially in the unsupervised case).

Additionally, by employing class representations which do not allow reconstruction of the original source samples and objects from which they are generated, customers can share their class means with other customers without providing access to the actual content of the source objects which could compromise their privacy.

A Domain Specific Class Means (DSCM) classifier which can be adapted to use herein is described in G. Csurka, et al., "Domain adaptation with a domain specific class means classifier," Computer Vision-ECCV 2014 Workshops (TASK-CV), pp. 32-46, 2014, and in above-mentioned U.S. application Ser. No. 14/504,837, incorporated by reference, collectively referred to herein as Csurka 2014. Such a classifier is combined with deep learning techniques for extraction features common to both sources and target. In the exemplary embodiment, deep learning is performed with sMDA, as described in Chen 2012. The sMDA framework is used to adapt the Domain Specific Class Means (DSCM) classifier. sMDA is able to exploit the correlation between the target data and the source representatives in unsupervised mode, enabling fast common feature extraction. However, other deep learning techniques may be used for unsupervised feature extraction. This allows generation of features common to both the target data and the source class means, i.e., to adapt the source class means to the target and to allow better prediction of class labels for the reconstructed target set with DSCM.

On a variety of datasets and tasks, the method can be applied successfully, even when no labeled target data is available. The method can provide performance comparable to the case where dense knowledge (all source data) is available.

FIG. 1 illustrates a computer-implemented domain adapted classification (DAC) system 10 in accordance with one aspect of the exemplary embodiment. The system includes memory 12, which stores instructions 14 for performing the method described in FIG. 2 and a processor 16, in communication with the memory, for executing the instructions. The system may be hosted by one or more computing devices, such as the illustrated server computer 18 and may include one or more input/output devices 20, 22 for communicating with external devices, such as remote customer computing devices 24, 26, etc., e.g., via a wired or wireless network, such as the Internet 28. Hardware components 12, 16, 20, 22 of the system 10 may communicate via data/control bus 30.

The DAC system 10 has access to a set of multidimensional class representations 32, 34, such as class means, computed for each of a set of classes, $c_1$, $c_2$, etc., for each of at least one (or at least two) different source domains $s_1$, $s_2$, etc., different from the target domain. As will be appreciated, there may be many more domains and classes than those illustrated, such as three, four, or more domains and/or classes. The class means 32, 34 may be received by the system 10 from the customer devices 24, 26, etc., where each customer may be considered to correspond to a different source domain. The class representations are computed using a set of source samples 36, 38, e.g., multidimensional representations of images or text documents in an input feature space, which are each labeled by class. As an example, the class labels may represent different types of document in the case of text documents, or different visual classes in the case of images, which have been manually applied to the samples. For each domain (customer) a class mean is computed for each class using the source samples labeled with that class. The samples are generated from the objects in a common feature space. The exemplary system 10 has no access to the underlying data (samples 36, 38 or objects they represent) from which the class means 32, 34 are generated. Thus, the customer data can remain confidential.

The DAC system 10 also receives, as input, target data, which may include a set of n target samples (multidimensional target representations) 40, in the same input feature space as the source samples. Each target sample has been generated from a respective unlabeled target object. The target data may be received from a third customer device 42. The system generates class labels 44 for the target samples using the class means 32, 34 acquired from a set of two or more of the source domains, which have been adapted to the target domain. As will be appreciated, source domains may serve as a target domains, and vice versa, in other cases.

The input target samples 40 and class representations 32, 34 together form an input set 46 of representations which are jointly adapted, by the system, to form a corresponding output set 47 of representations.

The exemplary instructions 14 include a combining component 48 which generates the input set 46 by concatenating the target samples 40 and class means 32, 34. A mapping component 50 learns a mapping (a transformation), or, more generally, a stack of mappings, for converting the source domain class means 32, 34 to adapted domain-specific representations (class means) 54 in a new feature space in which the features which are better predictors of the class labels across the domains are emphasized. The target samples 40 are also mapped, by the mapping component, into the new feature space to generate adapted target samples 56.

A classifier component 58 uses the adapted class means 56 to predict class labels for the target samples, based on the adapted target representations 56. In particular, the classifier component acts as a Domain-Specific Nearest Class Means (DSCM) classifier which computes, for a given target sample, a probability for each class based on the adapted class means. The probability, for a given class, can be computed as an aggregation, over the set of source domains, of an optionally weighted function of the distance between the adapted target sample and the corresponding adapted domain-specific class mean.

A labeling component 60 applies a label to the target sample 40, based on the classifier component output. The class with the highest probability can be assigned as the label of the target sample.

A sample processing component 62 may implement a computer implemented process, based on the applied label.

An output component 64 outputs information 44, such as the computed class labels for the target sample(s), processed target sample(s), or information based thereon.

The computer-implemented classification system 10 may include one or more computing devices 18, such as a PC, such as a desktop, a laptop, palmtop computer, portable digital assistant (PDA), a server computer, cellular telephone, tablet computer, pager, combination thereof, or other computing device capable of executing instructions for performing the exemplary method. For example, the labeling may be performed on a server computer 18 and the labels output to a linked client device 42, or added to a database (not shown), which may be accessible to the system 10 and/or client device 42, via wired or wireless links.

The memory 12 may represent any type of non-transitory computer readable medium such as random access memory (RAM), read only memory (ROM), magnetic disk or tape, optical disk, flash memory, holographic memory or combination thereof. In one embodiment, the memory 12 comprises a combination of random access memory and read only memory.

The digital processor 16 can be variously embodied, such as by a single-core processor, a dual-core processor (or more generally by a multiple-core processor), a digital processor and cooperating math coprocessor, a digital controller, or the like. The exemplary digital processor 16, in addition to controlling the operation of the computer system 18, executes the instructions 14 stored in memory 12 for performing the method outlined in FIG. 2.

The interface 20 is configured for receiving the sets of source domain class means 32, 34 and target samples 40 (or target objects from which the target samples are generated) and may include a modem linked to a wired or wireless network, a portable memory receiving component, such as a USB port, disk drive, or the like.

The customer devices may be similarly configured to the computer 18, with memory and a processor in communication with the memory, configured for interacting with the system 10.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
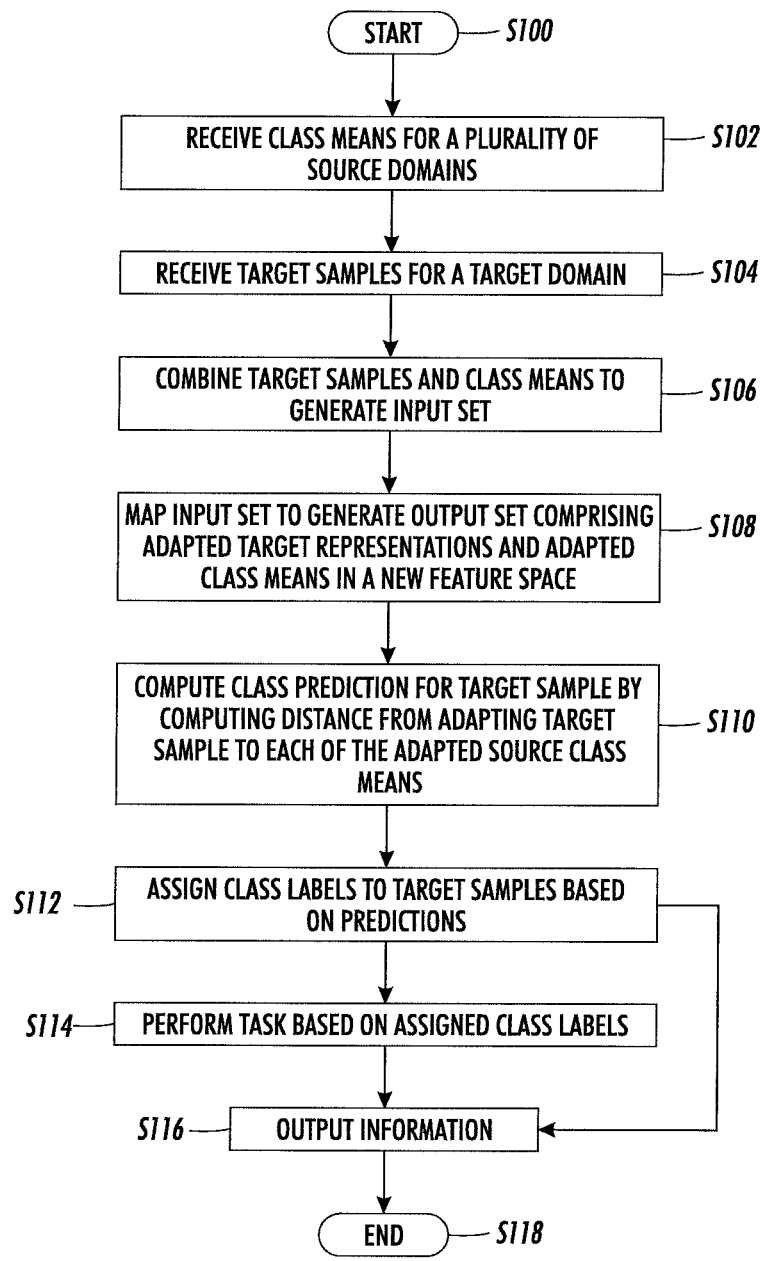
FIG. 2 is a flow chart illustrating a domain-adapted classification method in accordance with another aspect of the exemplary embodiment.

FIG. 2 illustrates a method for domain adaptation which can be performed with the method of FIG. 1. The method begins at S100.

At S102, for each of a plurality of source domains, a multidimensional class representation (e.g., class mean) is received for each of a plurality of classes, the class representations each having been generated from a set of multi-dimensional source sample representations in a common input feature space, which are labeled with a respective class.

At S104, target samples (multidimensional representations) 40 for a target domain, in the same input feature space as the class representations, are received, and may be stored in memory 12.

At S106, the target samples 40 and source class means 32, 34 are combined into an input set 46 of multidimensional representations.

At S108, the input set of target samples 40 and source class means 32, 34 are mapped to a new feature space, by the mapping component 50, and may be stored in memory 12.

At S110, class predictions for the target samples 40 are computed, for each of the classes, based on the adapted source class representations and adapted target samples, by the classifier component 58.

At S112, class labels are assigned to the target samples 40, based on the class predictions, by the labeling component 60.

At S114, a task may be performed, based on assigned class labels, by the sample processing component 62.

At S116, information 44 is output from the system, by the output component 64, such as the class labels assigned at S112 and/or the output of the task performed as S114.

The method ends at S118.

Figure 4:
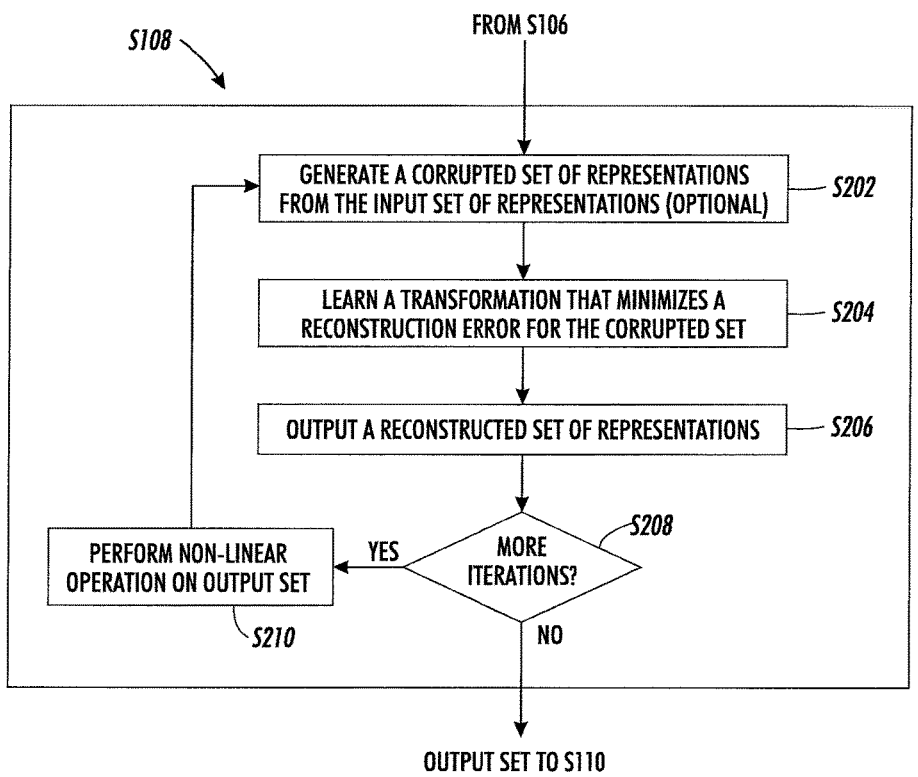
FIG. 4 is a flow chart illustrating mapping in the method of FIG. 2.

As illustrated in FIG. 4, the mapping (S108) may include, for at least one, or at least a plurality of iterations, optionally, generating a corrupted set of representations from the input set of representations (S202) (although not necessary, as described in the implementation below, where only a noise level is needed to learn a transformation), learning a transformation that minimizes a reconstruction error for the corrupted set (S204) when a reconstructed set is generated by applying the transformation to the corrupted set, and outputting an adapted (i.e., reconstructed) set of representations (S206). If at S208, more iterations are to be performed, the input set for a subsequent iteration is based on an adapted set of representations generated in a first of the iterations, optionally, after performing a non-linear operation (S210). Otherwise, the method proceeds from S208 to S110 where the output set of representations, including an adapted representation of each of the target samples and an adapted class representation for each of the classes, is used to compute the class predictions.

The method illustrated in FIGS. 2 and 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 18, (for example, an internal hard drive of RAM), or may be separate (for example, an external hard drive operatively connected with the computer 18), or may be separate and accessed via a digital data network such as a local area network (LAN) or the Internet (for example, as a redundant array of inexpensive of independent disks (RAID) or other network server storage that is indirectly accessed by the computer 18, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flow-chart shown in FIGS. 2 and 4, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Input Domain-Specific Class Means (S102)

The domain-specific class means 32, 34 input to the system 10 can be computed (e.g., by the respective customers) according to the method of Csurka 2014. In particular, the domain-specific class mean of a set $X_d$ of samples, $X_d = [x_1, x_2, \ldots, x_N]$, such as a set of image or document representations in set 36 or 38 for a given source domain s from a set S of source domains, that are labeled with a given class c, is computed as an average of the samples labeled with that class:

$$\mu_s^c = \frac{1}{N_s^c} \sum_{i: y_i = c, s \in S} x_i, \tag{1}$$

where $N_s^c$ is the number of source samples from the class c in domain s and $y_i$ is the ground-truth class label (e.g., manually applied label) of a respective source sample $x_i$ in $X_d$.

Since each source sample $x_i$ is a multidimensional feature vector of the same dimensionality, the average of the $N_s^c$ feature vectors is computed by adding together the values for each index in the vectors, and then dividing the total by $N_s^c$. This takes little computing time for the customer and the resulting domain-specific class means $\mu_s^c$ occupy little memory and can be updated when new samples become available or generated for new classes.

While the method of Csurka uses these class means for each class c∈C in each domain to predict the class label of an unlabeled target instance, based on a weighted softmax distance to these domain-specific class means, the present method adapts the class means using sMDA prior to prediction of class labels.

Adapting Target Samples and Source Class Means with Stacked Marginalized Denoising Autoencoders (S106)

Denoising autoencoders (DA) are one-layer neural networks that are optimized to reconstruct input data from partial and random corruption. These denoisers can be stacked into deep learning architectures in which each subsequent layer operates on the output of the previous layer.

The exemplary mapping component 50 used herein can be based on the stacked marginalized Denoising Autoencoder (sMDA) described in Chen 2012, which will now be briefly described. The sMDA is a version of the multi-layer neural network trained to reconstruct input data from partial random corruption (see, P. Vincent, et al., "Extracting and composing robust features with denoising autoencoders," ICML pp. 1096-1103, 2008). In the method of Chen, the random corruption is marginalized out, yielding the optimal reconstruction weights in the closed-form and avoids the need for backpropagation in tuning. Features learned with this approach lead to classification accuracy comparable with sDAs. See Z. Xu, et al., "From sBoW to dCoT marginalized encoders for text representation," CIKM, pp. 1879-1884, 2012. The software code for the sMDA of Chen is available on the author's webpage at http://www.cse.wustl.edu/~mchen/.

Figure 3:
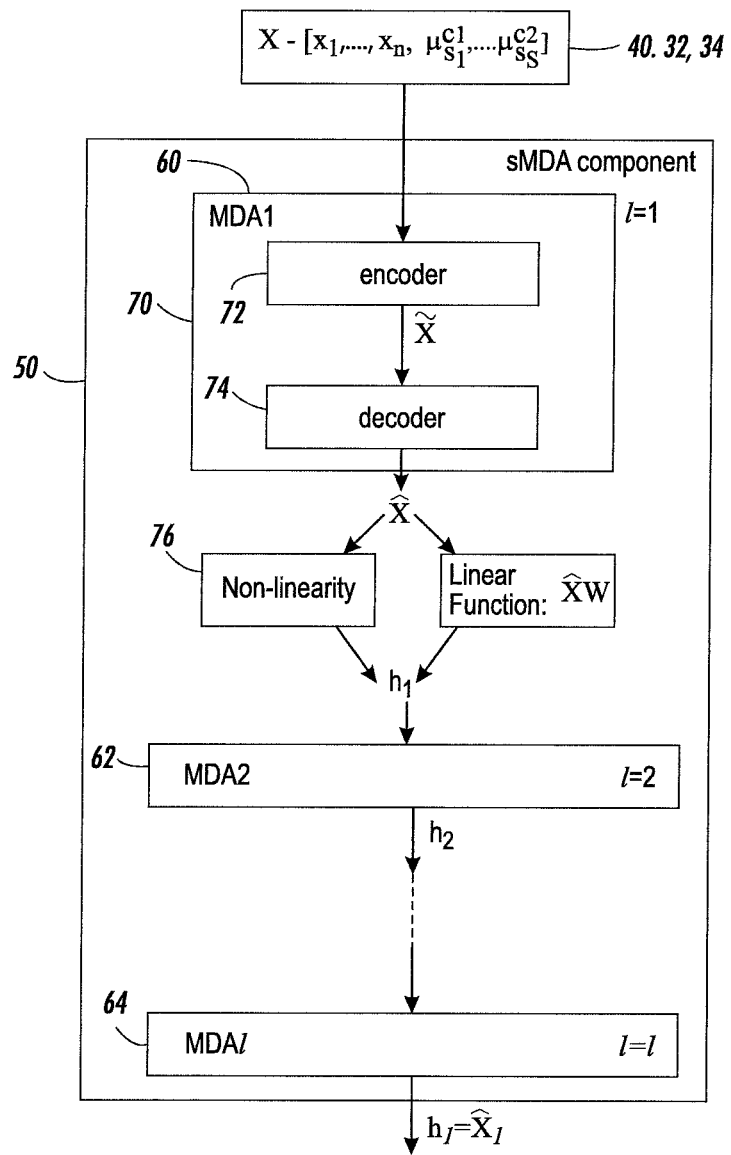
FIG. 3 is a functional block diagram of an sMDA component for use in the system of FIG. 1 in accordance with one aspect of the exemplary embodiment.

As illustrated in FIG. 3, the sMDA 50 is a stack of t layers 60, 62 64, etc., each layer including a linear denoising autoencoder (MDA) 70. Each autoencoder includes an encoder 72 and a decoder 74 (only the components of the first layer are shown for ease of illustration). Each encoder 72 takes as input a set X of representations and corrupts them by adding random noise to give a corrupted set of representations $\tilde{X}$. The decoder 74 then attempts to reconstruct the input representations producing, in the process, a reconstructed set of representations $\hat{X}$. In the present method, for the first layer 60, the input X to the autoencoder 70 includes a set of n target samples 40, denoted $X_T = [x_1, \ldots, x_n]$ as well as the computed class means $\mu_{s_i}^{c_i}$ from the source domains, denoted by $X_S = [\mu_{s_1}^{c_1}, \ldots \mu_{s_S}^{cC}]$, where S is the number of source domains and C the number of classes. Thus the input set 46 input to the first layer is $X = [X_T, X_S] = [x_1, \ldots, x_n, \mu_{s_1}^{c_1}, \ldots \mu_{s_S}^{cC}]$, i.e., a concatenation of the target samples and class means in the input feature space. The encoder 72 corrupts the input set X by random feature removal with a probability p, where 0<p<1. The corrupted inputs are denoted by $\tilde{x} = [\tilde{x}_1, \ldots, \tilde{x}_n, \tilde{\mu}_{s_1}^{c_1}, \ldots \tilde{\mu}_{s_S}^{cC}]$. The corruption is performed M times giving a matrix containing M corrupted sets of samples, denoted $\tilde{X} = [\tilde{X}_T \tilde{X}_S] = [\tilde{x}_1, \ldots, \tilde{x}_M]$.

For example, if p is 0.1, for each feature in the vector there is a 10% probability that its value is set to 0 in the corruption. p may be, for example, from 0.05 to 0.95. Suitable values of p may be feature-dependent. For example, p=0.5 may be used as a default value in the case of features obtained from a neural network, while for BOV, a default value of p=0.1 may be used (see examples below). A grid search may be performed, changing the value of p in increments of, for example, 0.05, to identify a suitable value of p.

The decoder 74 reconstructs the sample inputs with a linear mapping $W: R^s \to R^s$ that minimizes the squared reconstruction loss:

$$L(W) = \frac{1}{v} \sum_{j=1}^{M} \sum_{i=1}^{m} \|x_i - W\tilde{x}_{i,j}\|^2 \qquad (2)$$

where $\|x_i - W\tilde{x}_{i,j}\|$ is the norm of $x_i - W\tilde{x}_{i,j}$,
v represents the number of corrupted samples generated, i.e., v=mM, where m=n+(C×S), and
$\tilde{x}_{i,j}$ represents the jth corrupted version of the original input $x_i$.

Here, a constant feature can be added to the input, $x_i = [x_i; 1]$, and an appropriate bias b can be incorporated within the mapping W=[W; b] which is never corrupted.

The solution of Eqn. (2) can be expressed as the closed-form solution from ordinary least squares:

$$W = PQ^{-1}, \text{ where } Q = \tilde{X}\tilde{X}^T \text{ and } P = X\tilde{X}^T, \qquad (3)$$

and T is the transpose.

The solution of W depends on the corrupted sample inputs $\tilde{x}_{i,j}$. In practice, to compute W, iterative optimization of the loss (2), may be performed (e.g., using Stochastic Gradient descent) with a set of corrupted data or without explicit corruption of the data by marginalizing out directly the noise as described in Chen 2012. Chen 2012 has shown that by the weak law of large numbers, the matrices P and Q converge to their expected values $\mathbb{E}[P]$ and $\mathbb{E}[Q]$ as more copies of the corrupted data are created (letting M→∞). In the limit, the corresponding mapping for W can be expressed in closed form as:

$$W = \mathbb{E}[P]\mathbb{E}[Q]^{-1}, \qquad (4)$$

where the expectation of Q for a given entry in matrix $\mathbb{E}[Q]$, denoted $$(\mathbb{E}[Q])_{i,j} = \begin{bmatrix} S_{ij}q_iq_j, & \text{if } i \neq j, \\ S_{ij}q_i, & \text{if } i = j, \end{bmatrix}$$

and the expectation of P for a given entry in matrix $\mathbb{E}[P]$, denoted $\mathbb{E}[P]_{i,j=Si,j}q_j$
where i≠j indicates those values that are not on the diagonal of the matrix $\mathbb{E}[P]$, and i=j those values that are on the diagonal of the matrix,
$q = [1-p, \ldots, 1-p, 1] \in R^{f+1}$, where each element $q_i$ represents the probability of a feature i surviving the corruption, and $q_iq_j$ represents the probability of features i and j both surviving the corruption=$(1-p)^2$;
p is the noise level;
f is the feature dimensionality, and
$S = XX^T$ is the covariance matrix of the uncorrupted data X and $S_{ij}$ is an element of the matrix S.

With the help of these expectation matrices, the reconstructive mapping W can be computed directly in closed-form using Eqn. (4). This closed-form denoising layer is called a marginalized Denoising Autoencoder (MDA).

As illustrated in FIG. 3, a deep architecture 50 can be created by stacking together several such MDA layers where the representations output by the $(l-1)^{th}$ denoising layer are fed as the input to the $l^{th}$ layer. The outputs (reconstructed inputs $\hat{x}_{i,j}$ transformed with matrix W) serve as the inputs X for the next layer (optionally after a non-linear operation). The number of MDA layers 60, 62, 64 may be, for example, at least 2, or at least 3 or at least 4 and may be up to 100, or up to 20, or up to 10, or 5 or 6.

In order to extend the mapping beyond a linear transformation, between layers, a non-linearity 76 may be applied, such as applying, on each output, either tangent-hyperbolic nonlinearities:

$$h_l = \tan h(W^l h_{l-1}) \quad (5)$$

where $h_0 = X$ denotes the input,
or, alternatively, rectified linear units (RELU):

$$h_l = \max(W^l h_{l-1}, 0) \text{(setting values less than 0 to 0)} \quad (6)$$

Each transformation $W^l$ is learnt to reconstruct the previous layer's output $h_l$ from its corrupted equivalent. The final output $h_l$, corresponding to the reconstruction of input $X_l$ from $\tilde{X}_l$ with matrix $W^l$ is denoted $\hat{X}_l$.

An advantage of sMDA is that the loss function does not require class labels and hence the unlabeled target data can be employed for unsupervised domain adaptation.

In Chen's method, sMDA learns correlations between the source and target features and hence the reconstructed features will better describe what is common between the source and the target set. In the present method, however, it is assumed that there is no access to the source data directly. Rather, learning is achieved from the correlation between the source class representatives $\mu_{s_i}^{c_j}$, with $c_j \in C$ and $s_i \in S$, and the target data, to improve DSCM accuracies. In the exemplary method, the method of Chen 2012 is adapted by concatenating the target and source datasets $X_T$, $X_S$ to form input matrix X, i.e., the source inputs are the class means $\mu_{s_i}^{c_j}$ from the source denoted by $X_S = [\mu_{s_1}^{c_1}, \ldots \mu_{s_S}^{c_C}]$, which are added to the target samples denoted by $X_T = [x_1, \ldots, x_n]$ and the reconstructed matrix: $\hat{X} = [\hat{X}_T \hat{X}_S] = [\hat{x}_1, \ldots, \hat{x}_n, \hat{\mu}_{s_1}^{c_1}, \ldots \hat{\mu}_{s_S}^{c_C}]$. The SMDA framework can thus be applied to compute the mapping W using Eqn. (4) to reconstruct both the adapted source class means $\hat{\mu}_{s_i}^{c_j}$ and the adapted target samples $\hat{x}_u$.

In the exemplary embodiment, the noise level is the same for target and source samples. In another embodiment, different noise levels $p_t$ and $p_s$, respectively, can be considered for target and source. Then, the expected value $\mathbb{E}Q = \tilde{X}\tilde{X}^T]$ depends on whether $\tilde{x}$ is sampled from $X_T$ or $X_S$. Let $n_t$ denote the number of target samples and let $n_s = S \cdot C$. The fractions of source class labels and of target instances $\alpha_t$ and $\alpha_s$ are:

$$\alpha_t = \frac{n_t}{n_t + n_s} \text{ and } \alpha_s = \frac{n_s}{n_t + n_s} \quad (7)$$

Eqn. (4) can be generalized for the two noise vectors $q_t = [1-p_t, \ldots, 1-p_t, 1] \in \mathbb{R}^{n_t}$ and $q_s = [1-p_s, \ldots, 1-p_s, 1] \in \mathbb{R}^{n_s}$, as follows:

$$\mathbb{E}[Q]_{i,j} = \begin{cases} S_{ij}(\alpha_t q_{ti} q_{tj} + \alpha_s q_{si} q_{sj}), & \text{if } i \neq j, \\ S_{ij}(\alpha_t q_{ti} + \alpha_s q_{si}), & \text{if } i = j, \end{cases} \quad (8)$$

and the expectation of P becomes $$\mathbb{E}[P]_{i,j} = S_{i,j}(\alpha_t q_{tj} + \alpha_s q_{sj}) \quad (9)$$

In practice, however, using the same p for all samples appears to work well.

Prediction with the Domain Specific Class Means (DSCM) Classifier (S108)

Using the DSCM classifier of Csurka 2014, the adapted class means 54 $\hat{\mu}_{s_i}^{c_j}$ for each class $c_j \in C$ in each domain $s_i \in S$ can be used to predict the class label of an unlabeled target sample 40. This may include computing a distance from the representation of the target sample in the output set to each of the adapted class representations in the output set or computing a distance from an augmented representation generated from the target sample in the output set to each of a set of augmented class representations generated from the adapted class representations in the output set.

For example, given an unlabeled target sample $x_u$, it is labeled based on a weighted softmax distance from its respective adapted target representation $\hat{x}_u$ to the set of adapted domain-specific class means 54 $\hat{\mu}_{s_1}^{c_1}, \ldots \hat{\mu}_{s_S}^{c_C}$. In particular, a probability for each class $c_j$ is computed as an optionally weighted exponential function of the computed distance between the adapted representation of the target sample and respective adapted domain-specific class representation, summed over all considered domains, e.g., according to:

$$p(c_j | x_u) = \frac{1}{Z_u} \sum_{s_i=1}^{S} w_{s_i} e^{\left(-\frac{1}{2}\|\hat{x}_u - \hat{\mu}_{s_i}^{c_j}\|\right)}, \quad (10)$$

where $w_{s_i}$ is the mixture weight for the respective domain $s_i$,
the denominator $Z_u$ is a normalizer, e.g., $$Z_u = \sum_{c'} \sum_{s_i} w_{s_i} e^{\left(-\frac{1}{2}\|\hat{x}_u - \hat{\mu}_{s_i}^{c'}\|\right)},$$

which ensures that the posterior probabilities $p(c|x_u)$ sum to unity, and $\|\hat{x}_u - \hat{\mu}_{s_i}^{c_j}\|$ is a norm of the distance between vectorial representations $\hat{x}_u$ (or the respective transformed values $h_l^u$ after performing the non-linear transformation) and $\hat{\mu}_{s_i}^{c_j}$, such as the Euclidean distance.

Note that the ½ in Eqn. (10) is used by convention and can be omitted where the highest $p(c_j|x_u)$ is to be identified, since it is the relative probabilities which are of relevance in this case. Similarly, the normalizer $Z_u$ can be omitted if only the labels are of interest. However keeping $Z_u$ ensures that values between 0 and 1 are output, and hence can be seen as a confidence in assigning the label $c_j$.

In one embodiment, the weights $w_{s_i}$ are all set to 1, for example, when there is no labeled target data available for optimizing the weights. This works well in practice. If some labeled target data is available, the weights could be optimized on this set.

In another embodiment, if a class mean $\mu_t^{c_j}$ is available for the target domain, it can be added to X and the reconstructed $\mu_t^{cj}$ used in Eqn. (10). The weight for $\mu_t^{cj}$ may be higher than for the other domains, e.g., at least 1.5 or 2 times the other weights.

The label of the class giving the highest probability value, according to Eq. (10) can then be assigned to the target sample, i.e., $c^* = \operatorname{argmax}_{c \in Y_T} p(c|x_u)$. Alternatively, a probabilistic assignment over all labels may be used.

It may be noted that the model in Eqn. (10) corresponds to a generative model, where the probability for an instance $x_u$ to be generated by class c is given by a Gaussian mixture (GMM) distribution:

$$p(x_u|c_j) = \Sigma_{s_f=1}^S w_{s_f} N(\hat{x}_u, \hat{\mu}_{s_i}^{cj}|\Sigma), \qquad (11)$$

where $\Sigma = I$.

To predict class labels for the reconstructed unlabeled target examples $\hat{x}_u$ the DSCM classifier can be used with the reconstructed class means $\hat{\mu}_{s_i}^{cj}$ (prediction method 1). In another embodiment, the original feature representations can be concatenated with the reconstructed outputs (both for the class means and target samples) and DSCM can be applied in this concatenated feature space (prediction method 2). In this case, $\hat{x}_u$ is replaced by $[\hat{x}_u x_u]$ and $\hat{\mu}_{s_i}^{cj}$ by $[\hat{\mu}_{s_i}^{cj} \mu_{s_i}^{cj}]$.

Prediction method 2 is found to generally outperform method 1 on sample datasets. In the semi-supervised (SS) case, class means are also computed from the labeled target samples in the concatenated space, which are then used in the DSCM 58.

For example, in prediction method 1, sMDA is applied as above where all equations hold for the new input X. The same noise level can be used for the target data and the source class means. Alternatively a different noise level can be defined for the target data and the source class means, as described above.

Then, to predict class labels for unlabeled target examples, the DSCM classifier 58 can be used with the output (reconstructed) features such that the outputs corresponding to $X_S$ are used directly as source-specific class means to predict labels for the outputs corresponding to $X_T$.

In another embodiment, the output set is augmented prior to prediction. For example, the outputs of one or several layers of the sMDA are concatenated with the input features and DSCM is applied in this concatenated feature space. In the semi-supervised (SS) case, target domain specific class means can be computed with the labeled target examples, while in the case of unsupervised (US) domain adaptation, only the class means from the sources are used. In the latter case, if only a single source is available, this is equivalent to the NCM (nearest class mean) classification.

Source and Target Samples

The customers may employ a representation generator to generate the multidimensional representations 40, etc. of the objects in the initial feature space, based on features extracted from the source/target objects. Each multidimensional feature representation 36, 38, 40 includes f features (dimensions), where f may be at least 10, or at least 50, or at least 100, or at least 1000, or more.

In the case of images, for example, the samples generated for each object can be any suitable high level statistical representation of the image, such as a multidimensional vector generated based on features extracted from the image. Fisher Kernel representations, Bag-of-Visual-Word representations, run length histograms, and representations generated with convolutional neural networks (CNNs) are exemplary of such high-level statistical representations which can be used herein as an image representation.

The images being represented may be in any convenient file format, such as JPEG, GIF, JBIG, BMP, TIFF, or the like or other common file format used for images and which may optionally be converted to another suitable format prior to processing. The images may be still photographs or frames from a video sequence. In general, each input digital image includes image data for an array of pixels forming the image.

The bag-of-visual-words (BOV) method entails extracting a set of local descriptors, encoding them using a visual vocabulary (i.e., a codebook of prototypes), and then aggregating the codes into an image-level (or region-level) descriptor. These descriptors can then be fed to classifiers, typically kernel classifiers such as SVMs. See, Sivic, at al., "Video Google: A text retrieval approach to object matching in videos," ICCV, vol. 2, pp. 1470-1477, 2003; Csurka, et al., "Visual categorization with bags of keypoints," ECCV SLCV workshop, pp. 1-22, 2004; and U.S. Pub. Nos. 20080069456 and 20110091105. Approaches which encode higher order statistics, such as the Fisher Vector (FV) can provide improved results on a number of image classification tasks. See, Sánchez, et al., "Image classification with the fisher vector: Theory and practice," IJCV, 2013; Perronnin, et al., "Fisher kernels on visual vocabularies for image categorization," CVPR, pp. 1-8, 2007, Perronnin, et al., "Improving the fisher kernel for large-scale image classification," ECCV, pp. 143-156, 2010; Sánchez, et al., "Improving the fisher kernel for large-scale image classification," Proc. 11$^{th}$ European Conf. on Computer Vision (ECCV): Part IV, pp. 143-156 (2010); Sánchez, et al., "High-dimensional signature compression for large-scale image classification," CVPR 2011, and U.S. Pub. Nos. 20120076401 and 20120045134.

In the case of Fisher Kernel representations and Bag-of-Visual-Word representations, low level visual features, such as gradient (e.g., SIFT), shape, texture, or color features, or the like are extracted from patches of the image. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image. Each patch includes a plurality of pixels and may include, for example, at least 4, or at least 16 or at least 64 or at least 100 pixels. The number of patches per image or region of an image is not limited but can be for example, at least 16 or at least 64 or at least 128. The extracted low level features (in the form of a local descriptor, such as a vector or histogram) from each patch can be concatenated and optionally reduced in dimensionality, to form a features vector which serves as the global image signature. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the local descriptors are emitted. The patches can thus be characterized by a vector of weights, one weight per parameter considered for each of the Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, flower, autumn leaves, etc.), characteristic background (e.g., starlit sky, blue sky, grass field, snow, beach, etc.), or the like. Given an image to be assigned a representation, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the image representation or input to a generative model which outputs an image representation based thereon.

Various methods exist for generating representations based on neural networks. In this method, the sample to be represented (e.g., an image or a text document) is input to a sequence of convolutional layers and fully-connected layers. See, Krizhevsky, et al., "ImageNet classification with deep convolutional neural networks," NIPS, pp. 1106-1114, 2012; Zeiler, et al., "Visualizing and understanding convolutional networks," ECCV, pp. 818-833, 2014; Sermanet, et al., "OverFeat: Integrated recognition, localization and detection using convolutional networks," ICLR, 2014; Simonyan, et al., "Very Deep Convolutional Networks for Large-Scale Image Recognition," arxiv 1409.1556, 2014. Convolutional networks or "ConvNets" are trained in a supervised fashion on large amounts of labeled data. These models are feed-forward architectures involving multiple computational layers that alternate linear operations, such as convolutions or average-pooling, and non-linear operations, such as max-pooling and sigmoid activations. The image representation may be derived from the output of the final fully-connected layer, or from one of the intermediate layers. In some embodiments, the advantages of Fisher vectors and CNN's can be combined using a framework as described, for example, in U.S. application Ser. No. 14/793,434, filed Jul. 7, 2015, entitled EXTRACTING GRADIENT FEATURES FROM NEURAL NETWORKS, by Albert Gordo Soldevila, et al.

Run length histograms are described in U.S. Pub. No. 20100092084.

For generating representations of text documents, at least a portion of the words in the document are considered as the features and a histogram of word frequencies is computed. The histogram may consider the frequencies of each of a fixed word vocabulary (and/or short sequences of words), such as a limited dictionary of words/phrases which may exclude certain words commonly found in all documents (stop words). A transformation, such as a term frequency-inverse document frequency (TF-IDF) transformation, may be applied to the word frequencies to reduce the impact of words which commonly appear in the documents being represented. The word/phrase frequencies may be normalized, e.g., with L2 normalization. The result is in a vector of normalized frequencies (a document representation), where each element of the vector corresponds to a respective dimension in the multidimensional space.

The disclosures of all of these references are incorporated herein by reference in their entireties.

In some embodiments, score normalization is performed for each domain, e.g., according to:

$$x_{ij} = \frac{x_{ij} - \mathbb{E}(X_j)}{\text{std}(X_j)},$$

where $\mathbb{E}(X_j)$ and $\text{std}(X_j)$ are the mean and standard deviation of feature j within all instances of the set X.

Example Applications

There are numerous applications in which the system and method find application, such as in the classification of forms from different organizations, opinions, such as customer opinions of products and services, customer inquiries, health care data, transportation-related images, and the like.

As a specific example, audits and assessments may be performed of printer usage at customer sites with two objectives, to identify possibilities of print device rationalization, and to analyze the paper document usage. One goal of paper document usage analytics is to be able to propose electronic solutions to replace paper workflows, thus optimizing the overall process and reducing paper consumption at the same time. This analysis may be extended to more generic electronic document usage analysis. Paper document content analytics have conventionally been performed in a completely manual fashion, through surveys and interviews, organized with the customers and their employees.

In this context, U.S. Pub. No. 20140247461, published Sep. 4, 2014, entitled SYSTEM AND METHOD FOR HIGHLIGHTING BARRIERS TO REDUCING PAPER USAGE, by Willamowski, et al., which is incorporated herein by reference, describes a method for partially automating this process using machine learning techniques. It enables automatic analysis of printed documents' content to cluster and classify the documents and employs manually labeled documents for training. To increase privacy and reduce the need for manual labeling, the exemplary domain adaptation approach can be used. The current customer's data can be considered as the target domain. Source domains are document image datasets or labeled data from previous customers which can be used for learning a classifier for the current customer.

Domain adaptation can also be useful in classifying transportation images (such as images of vehicles and number plates) where differences in capturing conditions (daylight vs night, inside parking vs outside parking, camera and viewpoint changes) can lead to data sources with domain shift. This can affect the feature distribution and render conventional classifiers/detectors trained on one source less effective. Domain adaptation can be used to reduce the amount of manual labeling needed for each condition by exploiting the labeled data already available for other conditions.

In the context of sentiment analysis and opinion mining, customer comments concerning different services/products can vary considerably from one type of service/product to another. However, common features may be useful in assessing whether the customers are satisfied or not. Hence, reusing classifiers/representations learned on one service can strongly reduce the need of annotation concerning a new service.

In the above-mentioned example domains, there may be legislation on privacy and data protection, which specify that the original images/documents are private and thus cannot be stored other than for a short period of time. This presents an obstacle to many domain adaptation techniques which assume an unlimited access to the source instances. By representing source domains with a few selected instances which are aggregations of the source data, these privacy concerns can be met, since the aggregated source samples do not allow the reconstruction of the original content.

Advantages of the exemplary method include the following:

1) The method has low computational cost with results comparable to many complex existing methods. Furthermore it is easy to retrain the models if updated or new class means or new sources became available.

2) In contrast to many existing DA methods that assume single source versus target scenarios, the method can exploit multiple independent sources to predict labels for new target examples. Furthermore, the method requires only the class means from the different sources that can be precomputed beforehand and independently for each source, in contrast to methods which need to access simultaneously the whole source data to train models for the target.

3) The method can be applied in applications where customers care about their privacy issues (e.g., document images, medical fields, etc.) and are not ready to share the whole source data, only class averages from which it is not possible to reconstruct the original documents.

4) The method has only a few parameters. While fine-tuning them can yield better performance, it is possible to select reasonable prefixed values based on the data type and the document representation used.

Without intending to limit the scope of the exemplary embodiment, the following Examples illustrate the method.

EXAMPLES

The combined DSCM-sMDA method described above has been evaluated on a set of domain adaptation tasks, using the following image and text datasets.

1. Datasets

OFF31 and OC10: The Office31 and Office+Caltech10 datasets are two datasets frequently used for testing DA techniques See, K. Saenko, et al., "Adapting visual category models to new domains," ECCV, Vol. 6314 of Lecture Notes in Computer Science, pp. 213-226 (2010); Gong 2013; Gopalan 2011, B. Fernando, et al., "Unsupervised visual domain adaptation using subspace alignment, ICCV, pp. 2960-2967 (2013), M. Baktashmotlagh, et al., "Unsupervised domain adaptation by domain invariant projection, ICCV, pp. 769-776, 2013. The Off31 dataset includes three domains: Amazon (A), Dslr (D) and Webcam (W) and 31 product classes downloaded from amazon.com (Amazon) or taken in an office environment using a webcam or digital SLR camera (dslr), respectively. In the OC10 dataset, only 10 classes were used but a new domain Caltech (C) was added.

Each domain is considered in turn as a target domain, with the others as source domains. In the experiments, a Bag-of-visual words (BOV) representation (G. Csurka, et al., "Visual categorization with bags of keypoints," Workshop on statistical learning in computer vision, ECCV Workshop, Vol. 1, No. 1-22, pp. 1-2, 2004) built on SURF features (See, for example, H. Bay, et al, "SURF: Speeded up robust features," ECCV, pp. 404-417, 2006, hereinafter, Bay 2006) or set of deep convolutional activation features (J. Donahue, et al., "DeCAF: A deep convolutional activation feature for generic visual recognition," ICML, pp. 647-655 (2014)), was used. The latter features are obtained with the publicly available Caffe (8 layer) CNN model https://github.com/BVLC/caffe (see, A. Krizhevsky, et al., "Imagenet classification with deep convolutional neural networks," NIPS, pp. 1097-105 (2012)) trained on the 1000 classes of ImageNet used in the ILSVRC 2012 challenge (Olga Russakovsky, et al., "ImageNet Large Scale Visual Recognition Challenge," IJCV, pp. 1-42, 2015). The activation features from the 6th (fully connected) layer; referred to as caffe fc6, or simply fc6, were used in this case.

3VC: The 3 Virtual Customer dataset is a collection of document images from three different clients, where different types of documents are distinguished, such as forms, invoices, handwritten and typed letters, checks, bank statements, drawings, reports, etc. In total, there are 21 classes with variable numbers of documents per class (from 24 to 859). On these document images, the fc6 features of a similar (8 layer) CNN model as above were extracted, but the model was trained on the TobaccoBig dataset of 400K document images (A. Harley, et al., "Evaluation of deep convolutional nets for document image classification and retrieval," ICDAR, arXiv preprint arXiv:1502.07058, 2015).

AMT: The Amazon text dataset contains product reviews in different domains with 2 classes (positive and negative) represented by a TF-IDF normalized bag-of-words representation, which has been used in several studies for domain adaptation (see, Blitzer, et al, "Domain adaptation with coupled subspaces," ICAIS, 2011). Only the most frequent 10,000 features and the domains used in most studies: kitchen (K), dvd (D), books (B) and electronics (E) were considered. Approximately 5,000 documents for each class per domain were available.

In preliminary experiments, it was found that a single noise level, rather than using different noise level for the source class means and the target data, was easy to use and did not show a significant loss in quality. Accordingly, the following experiments, only a single noise level was used.

Validation Framework

Feature Normalization: As has been used in DA, z-score normalization of the features was used, except for text where the classical TF-IDF normalization was used. However, in contrast to existing methods, as each domain is handled independently, the z-score normalization is also done for each domain individually and hence all results including the baseline are obtained with these z-score normalized features:

$$x_{ij} = \frac{x_{ij} - \mathbb{E}(X_j)}{\text{std}(X_j)},$$

where $\mathbb{E}(X_j)$ and $\text{std}(X_j)$, where $\mathbb{E}(X_j)$ and $\text{std}(X_j)$ are the mean and standard deviation of feature j within all instances of the set X.

sMDA Settings: 5 layers 60, 62, 64, etc., are considered for the sMDA and the output of the fifth layer is concatenated with the original features to build the DSCM classifiers and provide the adapted target sampes. Between layers, either tangent-hyperbolic nonlinearities (denoted by ACMt) or rectified units (denoted by ACMr) are applied. Two main cases are considered:

1. For each configuration a grid search is performed, varying the noise level from 0.05 to 0.95 with a step 0.05 and the best value on the grid is kept. The corresponding results are denoted by ACMr * and ACMt * respectively.

2. Experiments are performed with fixed noise for all configurations and datasets given a feature type and the corresponding results denoted by ACMr$^f$ and ACMt$^f$.

Multiple Source Configurations: In general, given a dataset, the results show the average over all domain adaptation tasks. Thus, for OFF31, the classification accuracies are averaged over the following 9 tasks: DA, WA, (D,W)A, AD, WD, (A,W)D, AW, DW and (A,D)W, while for OC10, an average over CA, DA, ..., (A,C,D)W, in total 4*7=28 tasks, where AD means A is the source and D is the target and (A,D)W refers to case where A and D are sources and W is the target. AS denotes the case when all sources are considered (A,C,D) for the target T and BC denotes the best configuration found among them all, except AS.

Source Data Size: Two cases are distinguished, which depend on the amount of source examples used to pre-compute the class means. ase denotes the case where all source examples are used to build the class means and sse denotes the case where only a subsample of 20 examples is considered for each class given a source domain (except for D or W as source, where only 8 were selected, to allow comparison with prior methods). The latter is repeated 10 times and the averaged results are reported.

Experimental Results

1. BOV features: these features were used for OFF3 and OC10 to enable comparison with existing methods. Table 1 shows results obtained averaged over all configurations with the ase setting. The numbers are percentages corresponding to average class accuracies. The best results are shown in bold.

TABLE 1

Results using BOV features

| Dataset | DSCM | ACMt * | ACMt$^f$ | ACMr * | ACMr$^f$ |
|---|---|---|---|---|---|
| OFF31 ase US | 26.18 | 26.95 | 26.81 | 25.62 | 25.09 |
| OFF31 ase SS | 45.6 | 46.31 | 46.24 | 45.25 | 44.77 |
| OC10 ase US | 49.84 | 49.01 | 48.25 | 51.36 | 49.96 |
| OC10 ase SS | 55.31 | 58.63 | 56.86 | 57.82 | 55.84 |

It can be seen that ACMr performs in general less well (except for OC10 US) than using ACMt with the BOV features and ACMr results are sometimes below the baseline DSCM. On the contrary, ACMt outperforms DSCM even with a fixed noise level ($p_f$=0.1). Setting an appropriate noise level for each configuration can further improve the average accuracy.

In Table 2, results for individual target domains are shown for the case of OC10 ase (SS) using ACMt$^f$ with $p_f$=0.1. DSCM and ACMt results are compared when using only the target training set (T→T), the best configuration (DC→T) and all source domains (AS→T). It can be seen that, while best results are often obtained with some specific configuration choice, considering all available sources domains (AS) is a good compromise and still allows for significant improvements over the T→T with or without sMDA.

TABLE 2

OC10 ase (SS) results per target using BOV features

| T | DSCM T→T | ACMt$^f$ T→T | DSCM BC→T | ACMt$^f$ BC→T | DSCM AS→T | ACMt$^f$ AS→T |
|---|---|---|---|---|---|---|
| A | 43.86 | 44.94 | 53.56 | 54.09 | 50 | 50.22 |
| C | 33.49 | 33.58 | 42.82 | 42.09 | 40.44 | 42.45 |
| D | 59.8 | 59.84 | 72.44 | 70.87 | 67.72 | 69.29 |
| W | 58.49 | 60 | 76.98 | 78.49 | 72.45 | 73.21 |

2. Results with fc6 features: Table 3 shows results when caffee fc6 features were used in place of BOV features.

TABLE 3

Results using fc6 features on OFF31 and OC10

| Dataset | DSCM | ACMt * | ACMt$^f$ | ACMr * | ACMr$^f$ |
|---|---|---|---|---|---|
| OFF31 ase (US) | 77.72 | 80.59 | 78.4 | 82.46 | 80.61 |
| OFF31 ase (SS) | 85.07 | 86.83 | 85.99 | 87.19 | 86.54 |
| OFF31 sse (US) | 75.77 | 79.03 | 76.32 | 81.21 | 79.73 |
| OFF31 sse (SS) | 83.55 | 85.11 | 84.34 | 85.72 | 85.23 |
| OC10 ase (US) | 93.38 | 96.02 | 93.17 | 96.25 | 94.95 |
| OC10 ase (SS) | 90.08 | 96.4 | 94.3 | 96.17 | 94.94 |
| OC10 sse (US) | 92.49 | 96.07 | 92.52 | 95.94 | 93.89 |
| OC10 sse (SS) | 93.75 | 95.73 | 94.03 | 95.67 | 94.3 |

From the results with fc6 features shown in Table 3, it can be seen that with these deep features, using ACMr performs better than ACMt, especially with fixed noise level ($p_f$=0.5) and compared to the baseline, ACMr*, in average and most often, significant improvements are seen with both of them. It can be seen that using class means obtained even with a small set of source examples (sse) provides results close to those where all source examples are used (ase), suggesting that a large number of source domains is not necessary to get useful class prototypes.

ACMr$^f$ per target results are shown in Table 4. Comparing them with DSCM with or without sMDA, it can be seen that there is a significant gain with ACM. Furthermore with the fc6 features, best results are obtained when all the sources domains (AS) are considered.

TABLE 4

OC10 sse (SS) results per target using fc6 features

| Target T | DSCM T→T | ACMt$^f$ T→T | DSCM BC→T | ACMt$^f$ BC→T | DSCM AS→T | ACMt$^f$ AS→T |
|---|---|---|---|---|---|---|
| A | 93.34 | 93.91 | 94.99 | 95.23 | 95.15 | 95.36 |
| C | 84.51 | 86.9 | 90.33 | 91.15 | 90.7 | 91.73 |
| D | 94.02 | 92.52 | 97.32 | 97.64 | 97.09 | 97.56 |
| W | 90.79 | 90.42 | 97.47 | 98.15 | 97.66 | 98.23 |

It is to be understood that while the present method generally cannot be compared directly with existing methods, since these assume the access to the underlying source data when they learn the target classifiers, ACM can be also applied in that case too. On OFF31 (ase) SS with ACMr$^f$ using fc6, for AW an accuracy of 93.3% and for DW, 94.59% are obtained. The best results reported in Donahue 1999 using SVM with fc6 are 82.14% for AW, and 94.79% for DW, respectively.

On the US setting, the best accuracies reported in Ganin 2014 are 73% for AW and 96.4% for DW, while with ACMr$^f$ 75.21% is obtained for AW and 92.59% for DW.

Table 5 compares results on OC10 (ase) US with ATTM (Adaptive Transductive Transfer Machines) (see, Farajidavar 2014) which is a high-performing method for this dataset. Note that again, in contrast to the exemplary method, Farajidavar needs the whole source dataset to train the model.

TABLE 5

ACM compared to ATTM using fc6

| S→T | DSCM | ACMr$^f$ | ATTM (Farajidavar) |
|---|---|---|---|
| C→A | 95.26 | 95.15 | 92.17 |
| D→A | 90.3 | 94.07 | 91.65 |
| W→A | 92.24 | 94.83 | 92.27 |
| A→C | 89.48 | 91.03 | 86.55 |
| D→C | 87.56 | 90.85 | 82.28 |
| W→C | 89.02 | 91.77 | 83.44 |
| A→D | 90.55 | 91.34 | 90.45 |
| C→D | 93.7 | 94.49 | 92.99 |
| W→D | 100 | 100 | 100 |
| A→W | 87.17 | 92.45 | 89.15 |
| C→W | 91.7 | 93.21 | 90.84 |
| D→W | 97.74 | 98.87 | 98.98 |
| Average | 92.06 | 94 | 90.9 |

Results on the 3VC Dataset: In Table 6 DSCM is compared with ACM using different source settings with $p_f$=0.5 on the fc6 features extracted from the 3VC document image dataset. It can be observed again that ACMr outperforms ACMt consistently with the fixed noise level and in general is better with the optimal configuration.

TABLE 7

Results using TFIDF features on the AMT dataset

| Dataset | DSCM | ACMt* | ACMt$^f$ | ACMr* | ACMr$^f$ |
|---|---|---|---|---|---|
| AMT ase (US) | 75.35 | 77.84 | 76.73 | 75.61 | 61.78 |
| AMT ase (SS) | 69.59 | 77.85 | 75.48 | 72.78 | 75.48 |
| AMT sse (US) | 64.17 | 72.94 | 68.73 | 66.1 | 58.86 |
| AMT sse (SS) | 66.71 | 76.32 | 73.58 | 70.9 | 68.19 |

Comparison with ACM Using the Whole Source Data: In Table 8, ACM is compared to DSCM+sMDA, the dense case where the whole source dataset is used in the sMDA framework, to adapt the only source data (instead of adapting the means) and computing the class means from adapted source examples before applying the DSCM. Both the fixed and the tuned noise level are considered, and results when all source examples were used (ase) are shown. For comparison, 5 layers were used and the fifth concatenated on to the original features, also in the case of DSCM+sMDA. The fixed noise level p was set to 0.5 (except for BOV where 0.1 was used) and ACMt used (except for fc6 for which RELU was used).

TABLE 8

Comparing results with the dense case (DSCM + SMDA)

| Dataset | features | ACM t/r | $p_f$ | DSCM | DSCM + sMDA * | DSCM + sMDAp$_f$ | sMDA * | sMDAp$_f$ |
|---|---|---|---|---|---|---|---|---|
| OFF31 (US) | BOV | t | 0.1 | 26.18 | 26.95 | 26.81 | 27.98 | 27.31 |
| OFF31 (SS) | BOV | t | 0.1 | 45.6 | 46.31 | 46.24 | 45.64 | 45.29 |
| OC10 (US) | BOV | t | 0.1 | 49.84 | 49.01 | 48.25 | 51.73 | 50.04 |
| OC10 (SS) | BOV | t | 0.1 | 55.31 | 58.63 | 56.86 | 57.1 | 55.21 |
| OFF31 (US) | caffee-fc6 | r | 0.5 | 77.72 | 82.46 | 80.61 | 80.11 | 78.48 |
| OFF31 (SS) | caffee-fc6 | r | 0.5 | 83.55 | 87.19 | 86.54 | 86.92 | 85.52 |
| OC10 (US) | caffee-fc6 | r | 0.5 | 93.38 | 96.25 | 94.95 | 95.25 | 94.8 |
| OC10 (SS) | caffee-fc6 | r | 0.5 | 90.08 | 96.17 | 94.94 | 95.78 | 93.44 |
| AMT (US) | TFIDF | t | 0.5 | 75.35 | 77.84 | 76.73 | 77.52 | 76.91 |
| AMT (SS) | TFIDF | t | 0.5 | 69.59 | 77.85 | 75.48 | 77.91 | 75.89 |

TABLE 6

Results using fc6 features on the 3VC dataset

| Dataset | DSCM | ACMt * | ACMt$^f$ | ACMr* | ACMr$^f$ |
|---|---|---|---|---|---|
| 3VC ase US | 44.07 | 48.2 | 39.28 | 47.08 | 45.85 |
| 3VC ase SS | 90.37 | 94.33 | 92.69 | 94.77 | 93.68 |
| 3VC sse US | 42.99 | 47.2 | 40.02 | 48.94 | 45.48 |
| 3VC sse SS | 89.61 | 93.92 | 92.28 | 93.58 | 92.6 |

Results on the AMT Text Dataset: Table 7 compares DSCM with ACM using the different source settings where the fixed noise level was set to $p_f$=0.5. The results were again obtained as an average over as configurations, DB, EB, KB, (D,E)B, . . . (B,D,E)K. With these features ACMt outperformed ACMr.

From these results, it can be seen that both for the fixed noise level and when considering the optimal choice of the noise for each configuration, ACM often outperforms DSCM+sMDA and when this is not the case, it is still highly competitive.

The results suggest that the exemplary system and method can provide a simple and yet powerful method with low computational cost for domain adaptation that only needs class means/prototypes from the source domains and hence can be applied in a wide range of real scenarios, particularly those concerned with privacy issues. The method has only a few parameters, for which reasonable default values, depending on the type of representation used, are suggested. The method performs similarly to the dense case (DSCM+sMDA) and can be applied successfully even if the source data is available.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A domain-adapted classification method comprising:
mapping an input set of representations to generate an output set of representations using a learned transformation, the input set of representations including a set of target samples from a target domain and, for each of a plurality of source domains, a class representation for each of a plurality of classes, the class representations each being representative of a set of source samples from the respective source domain labeled with a respective class, the output set of representations including an adapted representation of each of the target samples and an adapted class representation for each of the classes for each of the source domains;
predicting a class label for at least one of the target samples based on the output set of representations; and
outputting information based on the predicted class label,
wherein the mapping comprises, for at least one iteration:
learning a transformation that minimizes a reconstruction error when a corrupted set of representations, generated from the input set of representations, is transformed, with the transformation, to generate a reconstructed set of representations, and
outputting the reconstructed set of representations or adapted representations generated therefrom,
wherein each of the class representations and the target samples is a multidimensional representation comprising at least 10 dimensions, and
wherein at least one of the mapping of the input set of representations and the predicting of the class label is performed with a processor.

2. The method of claim 1, wherein the class representations are class means.

3. The method of claim 1, wherein the at least one iteration comprises a plurality of iterations and for a subsequent iteration, the input set is based on a reconstructed set of representations generated in a previous iteration.

4. The method of claim 3, wherein the input set for the subsequent iteration is generated by performing a non-linear transformation on the reconstructed set of representations generated in the previous iteration.

5. The method of claim 1, wherein the corrupted set of representations from the input set of representations corresponds to removing features from the input set with a predefined probability.

6. The method of claim 1, wherein for at least one iteration, the learning of the transformation is performed without generation of the corrupted set of representations, by using a closed form-solution to marginalize out noise.

7. The method of claim 6, wherein in the closed-form solution, the transformation $$W = \mathbb{E}[P]\mathbb{E}[Q]^{-1}, \quad (4)$$

where the expectation of Q for a given entry in matrix $\mathbb{E}[Q]$, denoted $$(\mathbb{E}[Q]_{i,j}) = \begin{bmatrix} S_{ij}q_iq_j, & \text{if } i \neq j, \\ S_{ij}q_i, & \text{if } i = j, \end{bmatrix}$$

and the expectation of P for a given entry in matrix $\mathbb{E}[P]$, denoted $\mathbb{E}[P]_{i,j} = S_{ij}q_j$, where $i \neq j$ indicates those values that are not on a diagonal of the matrix $\mathbb{E}[P]$, and $i = j$ those values that are on the diagonal,
$q = [1-p, \ldots, 1-p, 1] \in \mathbb{R}^{f+1}$, where each element $q_i$ represents the probability of a feature i surviving the corruption, and $q_iq_j$ represents the probability of features i and j both surviving the corruption $= (1-p)^2$;
p is a predefined probability;
f is a feature dimensionality, and
$S = XX^T$ is a covariance matrix of the uncorrupted data X and $S_{ij}$ is an element of the matrix S.

8. The method of claim 1, wherein the predicting of the class label for the at least one of the target samples comprises computing one of:
a distance from the representation of the target sample in the output set to each of the adapted class representations in the output set; and
a distance from an augmented target representation to each of a set of augmented class representations, the augmented target representation being generated from the target representation in the output set, the augmented class representations being generated from the adapted class representations in the output set.

9. The method of claim 8, wherein the augmented representations are generated by at least one of:
concatenating the output sets of a plurality of the iterations; and
concatenating the input set and the output set.

10. The method of claim 1, wherein the predicting of the class label for the at least one of the target samples comprises, for each class, computing an optionally-weighted softmax distance from the adapted target representation to the adapted class representations for that class.

11. The method of claim 1, wherein the mapping and the prediction are performed without access to the source samples.

12. The method of claim 1, further comprising receiving the class representations for each of the plurality of source domains and the target samples and combining them to generate the input set of representations.

13. The method of claim 12, wherein the combining comprises concatenating the class representations and the target samples.

14. The method of claim 1, wherein the source samples and target samples are representations of objects selected from images and text documents.

15. The method of claim 1, wherein the outputting information comprises outputting a predicted class label for the at least one target sample.

16. A computer program product comprising a non-transitory recording medium storing instructions, which when executed on a computer, causes the computer to perform the method of claim 1.

17. A system comprising memory which stores instructions for performing the method of claim 1 and a processor in communication with the memory for executing the instructions.

18. A classification system comprising:
a mapping component which maps an input set of representations to generate an output set of representations, the input set of representations including a set of target samples from a target domain and, for each of a plurality of source domains, a class representation for each of a plurality of classes, the class representations each being representative of a set of source samples labeled with a respective class, the output set of representations including an adapted representation of each of the target samples and an adapted class representation for each of the classes for each of the source domains;

a classifier component which, for each of the classes, generates a classifier based on the adapted class representations for that class for each of the source domains and predicts a label for at least one of the target samples using the classifiers;

an output component which outputs information based on the predicted class label; and a processor which implements the combining component, mapping component, classifier component, and output component.

19. The system of claim 18, wherein the output information comprises a predicted class label for the at least one target sample.

20. A classification method comprising:

with a stacked marginalized Denoising Autoencoder, learning a transformation for mapping an input set of representations to generate an output set of representations, the input set of representations including a set of target samples from a target domain and, for each of a plurality of source domains, a class representation for each of a plurality of classes, the class representations each being representative of a respective set of source samples from a respective one of the source domains labeled with a respective class, the output set of representations including an adapted representation of each of the target samples and an adapted class representation for each of the classes for each of the source domains;

mapping the input set of representations with the learned transformation;

for each class, generating a classifier with the adapted class representations for that class for each of the source domains;

predicting a class label for at least one of the target samples with the classifiers; and outputting information based on the predicted class label, wherein the learning, the mapping and the predicting is performed with a processor.

21. The system of claim 18, wherein the mapping component, for at least one iteration:

learns a transformation that minimizes a reconstruction error when a corrupted set of representations generated from the input set is transformed, with the transformation, to generate a reconstructed set of representations from the input set of representations, and outputs the reconstructed set of representations or adapted representations generated therefrom.

22. The system of claim 18, wherein the class representations and target samples are each multidimensional representations comprising at least 10 dimensions.

* * * * *